United States Patent
Schmidt

(10) Patent No.: US 7,255,452 B2
(45) Date of Patent: Aug. 14, 2007

(54) PLASTIC MIRROR ASSEMBLY

(75) Inventor: William Schmidt, Newport, MI (US)

(73) Assignee: Mirror Lite

( * ) Notice: Subject to any disclaimer, the term of this patent is extended or adjusted under 35 U.S.C. 154(b) by 1435 days.

(21) Appl. No.: 09/882,216

(22) Filed: Jun. 15, 2001

(65) Prior Publication Data
US 2006/0050415 A1 Mar. 9, 2006

Related U.S. Application Data

(60) Provisional application No. 60/211,938, filed on Jun. 15, 2000.

(51) Int. Cl.
*G02B 5/10* (2006.01)
*G02B 7/182* (2006.01)

(52) U.S. Cl. .............. 359/871; 359/868; 359/900

(58) Field of Classification Search ............ 359/838, 359/868, 869, 871, 872, 900
See application file for complete search history.

(56) References Cited

U.S. PATENT DOCUMENTS

| | | | | |
|---|---|---|---|---|
| 3,142,148 | A * | 7/1964 | Morgan et al. | 368/238 |
| 4,662,717 | A * | 5/1987 | Yamada et al. | 359/362 |
| 4,862,334 | A * | 8/1989 | Ivey et al. | 362/149 |
| 5,018,223 | A * | 5/1991 | Dawson et al. | 2/436 |
| 5,155,624 | A * | 10/1992 | Flagler | 359/510 |
| 5,493,453 | A * | 2/1996 | Yamazaki et al. | 359/871 |
| 5,521,763 | A * | 5/1996 | Ono et al. | 359/819 |
| 6,094,983 | A * | 8/2000 | Pearl | 73/431 |
| 6,325,519 | B1 * | 12/2001 | Lang | 359/871 |
| 6,581,315 | B2 * | 6/2003 | Turner et al. | 40/642.02 |
| 6,932,497 | B1 * | 8/2005 | Huang | 362/494 |
| 7,018,056 | B2 * | 3/2006 | Moret et al. | 359/515 |
| 2002/0027727 | A1 * | 3/2002 | Lang et al. | 359/879 |

FOREIGN PATENT DOCUMENTS

DE 3049169 A1 * 7/1982

* cited by examiner

*Primary Examiner*—Ricky D. Shafer
(74) *Attorney, Agent, or Firm*—John A. Artz; Dickinson Wright PLLC

(57) ABSTRACT

A mirror assembly particularly adapted for use with an exterior automotive fender includes a plastic housing and plastic reflective surface element or lens. The housing has a slot formed therein which receives a tab formed on the lens to enable the housing and the lens to be snap-fitted together.

2 Claims, 2 Drawing Sheets

PLASTIC MIRROR ASSEMBLY

CROSS-REFERENCE TO RELATED APPLICATIONS

This application is a completion application of co-pending U.S. Provisional Patent Application Ser. No. 60/211,938, filed Jun. 15, 2000, and entitled, "PLASTIC MIRROR ASSEMBLY", the disclosure of which is hereby incorporated by reference.

BACKGROUND OF THE INVENTION

The present invention relates to vehicular mirrors. More particularly, the present invention concerns plastic vehicular mirror assemblies. Even more particularly, the present invention relates to plastic vehicular mirror assemblies and methods of manufacture therefor.

PRIOR ART

As is known to those skilled in the art to which the present invention pertains, the use of plastic mirrors, both interiorly and exteriorly, in association with automotive vehicles has been well known. Generally, such mirrors, especially exterior school bus mirrors, comprise a plastic housing to which is secured a plastic silverized reflective surface or lens. Usually, the lens is formed from a suitable plastic material onto which is deposited a silverized surface. The silverized surface defines a reflective surface. Also, the lens has a curvature imparted thereto in order to achieve the desired or necessary field of view when the mirror assembly, the lens and housing is installed on the vehicle.

The other component of the assembly, the mirror housing or backing, is a molded plastic part in which is housed mounting bracketry; heating elements, remote control operation electronics, lighting accessories and the like. As explained below, typically, the housing is manufactured with a lip or shoulder on or in which is seated an edge portion of the lens. A rubber gasket is fitted to the housing to finish the assembly. The gasket covers any unsightly appearance where the lens is mated to the housing, as well as sealing off the housing interior from water due to rain, car washing, snow and the like.

In manufacturing such plastic mirror assemblies, it is to be appreciated that they offer the advantage of being cheaper to manufacture than those assemblies which utilize glass lenses. Also, plastic lenses are more durable than glass lenses and less susceptible to breakage. However, in manufacturing the plastic mirror assemblies it is necessary to glue the lens to the housing. This assembly step is a time-consuming manual task which adds to the cost of manufacture. As discussed below, the present invention provides a means for eliminating the gluing of the lens to the housing.

SUMMARY OF THE INVENTION

In accordance with the present invention, there is provided a mirror head assembly or mirror which is particularly adapted for use as an exterior automotive mirror assembly. The mirror hereof, generally, comprises a housing and a lens, the lens and housing, each being formed from a suitable plastic material.

The housing is provided with at least one, and, preferably, a plurality of slots disposed thereon.

The lens or mirror has a plurality of peripheral upstanding outwardly-projecting tabs, each one tab being associated with a slot formed in the housing. The lens has a sufficient flexibility to enable the tabs to be "snap fitted" into their associated slots. In this manner, there is provided an easily assembleable mirror head and assembly which can be easily repaired.

In another aspect hereof, the present invention provides a method of producing a mirror head assembly which, generally, comprises:

(a) forming a mirror housing, the mirror housing including an upstanding peripheral wall, at least one slot being formed in the peripheral wall, and (b) providing a lens, the lens having at least one tab extending from the edge of the element, the tab being dimensioned to fit within the slot.

For a more complete understanding of the present invention, reference is made to the following detailed description and accompanying drawing. In the drawing like reference characters refer to like parts throughout the several views in which:

DESCRIPTION OF THE PREFERRED EMBODIMENT

Figure 1:
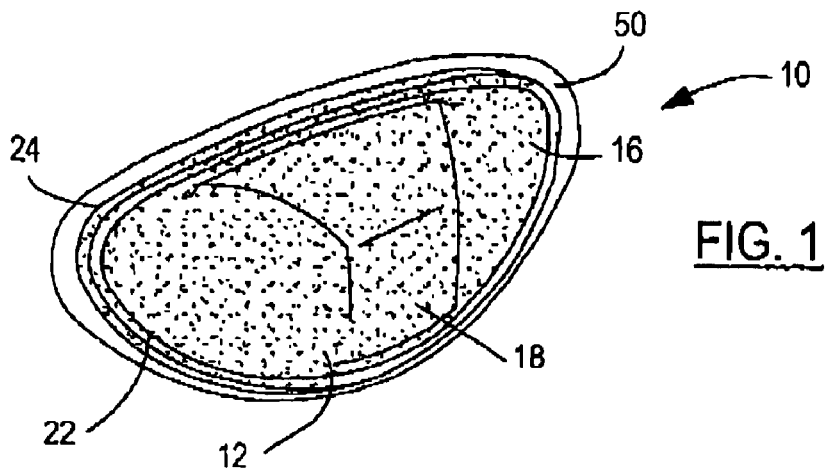
FIG. 1 is a perspective rear view of a plastic vehicular mirror assembly in accordance with the present invention.
Figure 2:
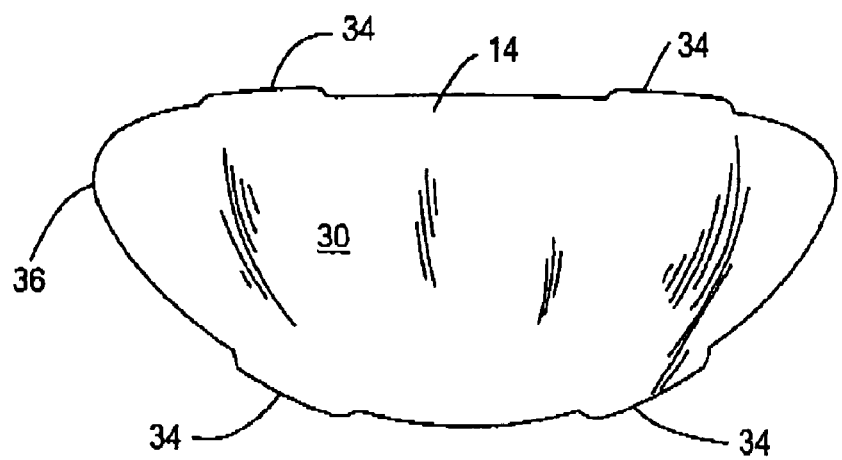
FIG. 2 is a front view of a plastic reflective lens for use in the present invention.
Figure 3:
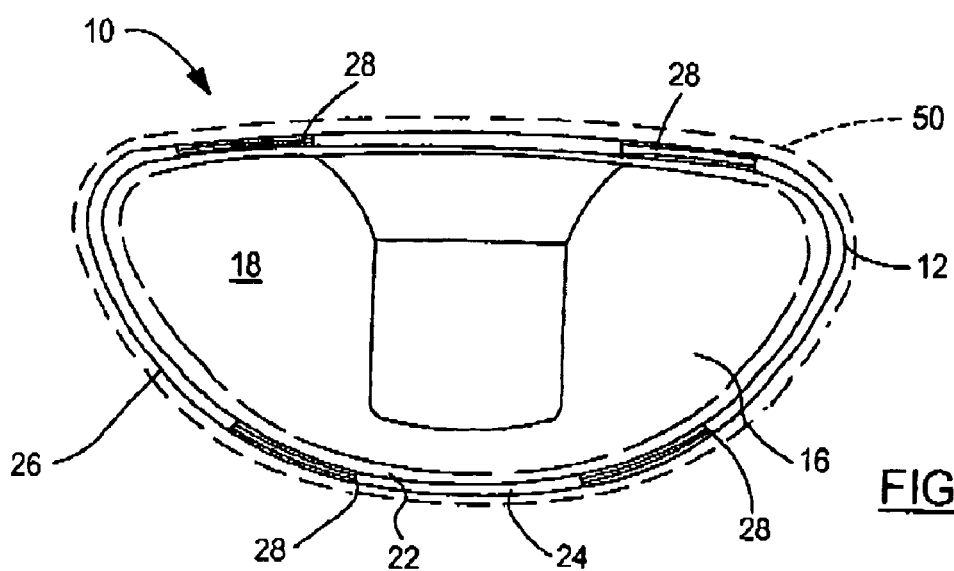
FIG. 3 is a front elevational view of a mirror housing in accordance with the present invention.
Figure 4:
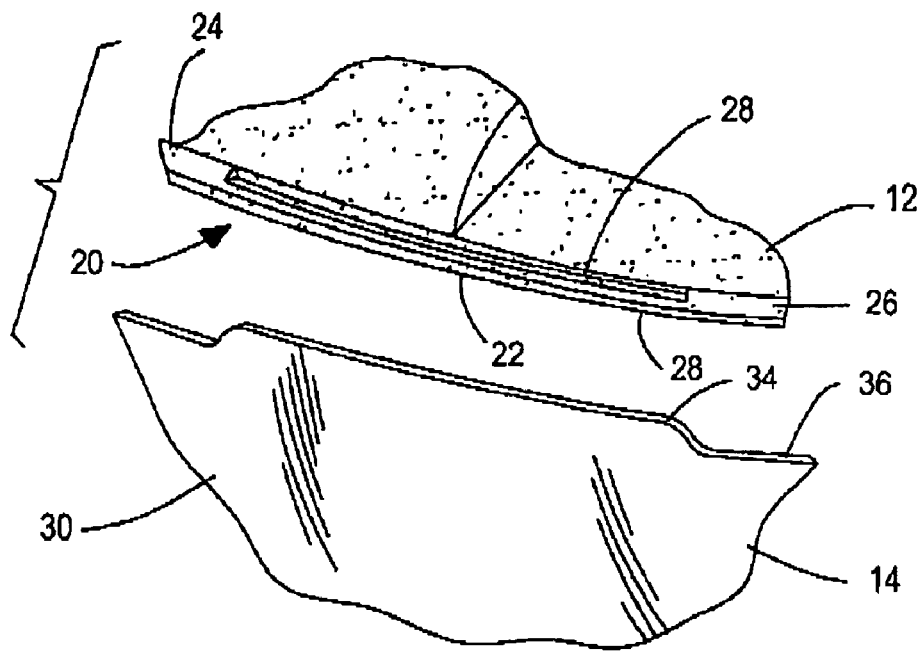
FIG. 4 is a exploded perspective partial view of a lens and housing in accordance herewith in an unassembled state.
Figure 5:
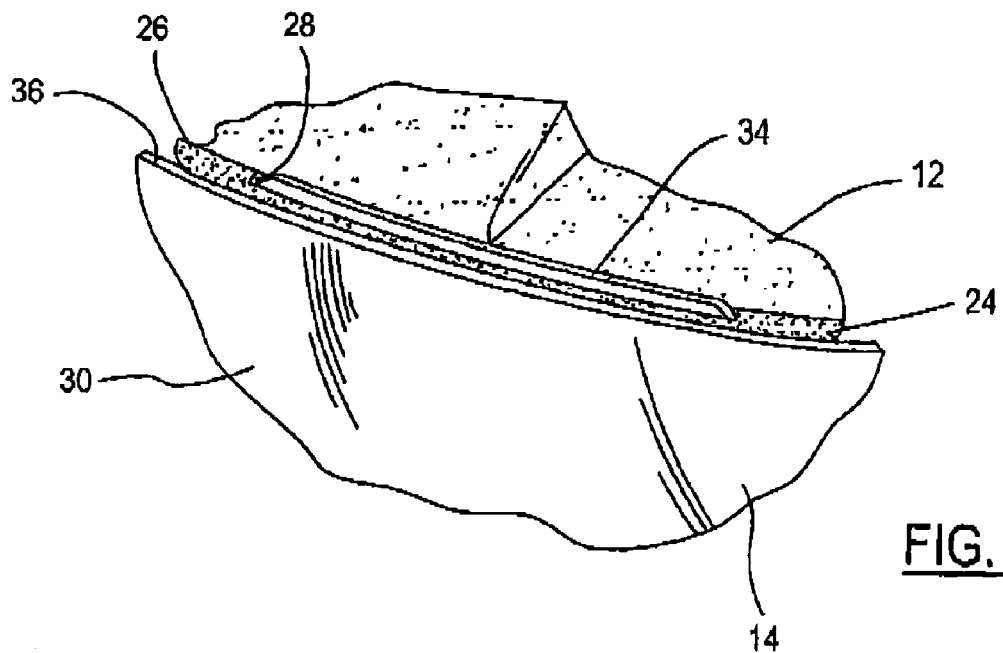
FIG. 5 is a view similar to FIG. 4, but showing the lens and housing in an assembled.

Now, and with reference to the drawing, there is depicted herein a vehicular mirror head assembly in accordance herewith and, generally, denoted at 10. The assembly 10 comprises a housing 12, a lens 14 and means for snap-fitting the lens to the housing.

As shown, the housing 12 comprises a plastic body 16 defining a shell 18 having an open end 20. The shell 18 is an irregularly or regularly shaped member having a parametric edge or shoulder 22 which bounds the end 20. Preferably, an upstanding wall 24 extends upwardly from the shoulder 22 and terminates at an edge 26. The shoulder 22 defines a seat or ledge for the lens 14 as described below.

In accordance herewith, and as shown, at least one and, preferably, a plurality of openings or slot 28 are provided in the wall 24. Where a plurality of openings are provided, they are circumferentially positioned on the wall 24 about the periphery of the open end 20. As will become apparent hereinafter the opening(s) or slot(s) 28 cooperate with complementary structure on the lens 14 of the assembly 10 to provide the means for snap-fitting the lens to the housing.

The lens 14 has a front surface 30 and a rear surface (not shown). The rear surface has a reflective material deposited thereon for creating a reflective surface for viewing objects therein. Although not critical hereto, it should be noted that ordinarily the lens has a pre-determined curvature imparted thereto during manufacture, be it convex, elliptical, etc for providing the requisite viewing area or field of view. The lens has an edge 36 defined therearound. Regardless of the configuration of the lens, at least one tab 34 and, preferably, a plurality of tabs 34 are disposed at the edge 36 of the lens 14. Preferably, the tab 34 is integrally formed with the lens 14 and extend(s) outwardly from the edge 36.

Preferably there is one tab 34 per slot or opening, although there may be less tabs than openings or vice versa.

The tabs are circumferentially disposed about the perimeter of the lens and are dimensioned to snap fit into their associated openings 28. The cooperation between the tabs and openings enables a mechanical interconnection therebetween that eliminates the need for gluing the lens to the housing.

In creating a mirror assembly by the practice of the present invention the lens 14 is brought into contact with the housing 12 such that the perimetral area of the lens proximate the edge 36 seats on or is connected with the ledge 22. The lens 14 is oriented such that the tab(s) is aligned with an associated opening or openings. The tab(s) 34 is snap-fitted into its associated opening(s) 28 to, thus, mount or connect the lens to the housing. It is thus seen that the tab and opening or plurality thereof cooperate to define means for snap-fitting the lens to the housing. Thus, the mirror hereof is assembled by a method of providing complementary tabs and openings on the lens and housing, respectively, and thereafter snap-fitting the lens and housing together by inserting the tabs into associated slots.

After mounting the lens to the housing, a gasket 50 is fitted onto the housing 12 at the edge 26 of the wall 24 to finish the assembly 10.

It should be noted and as shown in the drawing, the height wall 24 has a height which is greater than the thickness of the lens to ensure that the slot is dimensional such that the tab is nested between the lower end and upper end of the wall.

It is apparent from the preceding that the present invention provides an efficient and effective way for assembling plastic mirrors that eliminates the need for gluing the lens and housing together. The present invention is particularly advantageous in that the tabs can be formed during the molding of the lens and, similarly, the openings can be pre-formed during the molding of the housing.

In use, the mirror head assembly is affixed to suitable bracketry well known to the skilled artisan. Such bracketry includes a mounting shaft having one end connected to the housing and the other end secured to the vehicle through a suitable mount adapted for that portion of the vehicle to which the mirror head assembly is to be located.

Having, thus, described the invention, what is claimed is:

1. A vehicular mirror head assembly for a vehicle comprising:

a housing member adapted for said vehicle, said housing member being made of a plastic material and having a substantially solid rear portion and an open front portion, said open front portion having a perimetral wall defining an opening;

said housing member having a ledge member formed around said perimetral wall of said open front portion, said ledge member having a plurality of slotted apertures positioned around the perimeter of said open front portion;

a lens member positioned in said opening, said lens member being made of a plastic material and having a size and shape substantially the same as said open front portion of said housing member, said lens member having a reflective surface thereon and having a plurality of tab members extending outwardly in the plane of the reflective surface from an edge thereof, said tab members positioned in and mated with said slotted apertures; and a gasket member, said gasket member made from an elastomeric material and positioned on said ledge member around the perimeter of said open front portion, said gasket member surrounding said housing member and sealing said slotted apertures from water and other environmental matters.

2. A method of manufacturing a vehicular mirror head assembly for a vehicle:

(a) providing a housing member adapted for said vehicle, said housing member being made of a plastic material and having a substantially solid rear portion and an open front portion, said open front portion having a perimetral wall defining an opening;

said housing member having a ledge member formed around said perimetral wall of said open front portion, said ledge member having a plurality of slotted apertures positioned around the perimeter of said open front portion;

(b) providing a lens member, said lens member being made of a plastic material and having a size and shape substantially the same as said open front portion of said housing member, said lens member having a reflective surface thereon and having a plurality of tab members extending outwardly in the plane of the reflective surface from an edge thereof;

(c) assembling said lens member onto said housing member, said assembly comprising positioning said lens member in said open front portion of said housing member and positioning said tab members in said slotted apertures;

(d) providing a gasket member made from an elastomeric material; and (e) assembling said gasket member on said housing member, said gasket member being positioned on said ledge member and covering said slotted apertures.

* * * * *